Dec. 1, 1970    P. WEIEN    3,543,563

CONTROL VALVE ASSEMBLY

Filed Oct. 24, 1968    2 Sheets-Sheet 1

*INVENTOR*
PAUL WEIEN

BY
Sherman & Shalloway
*ATTORNEY*

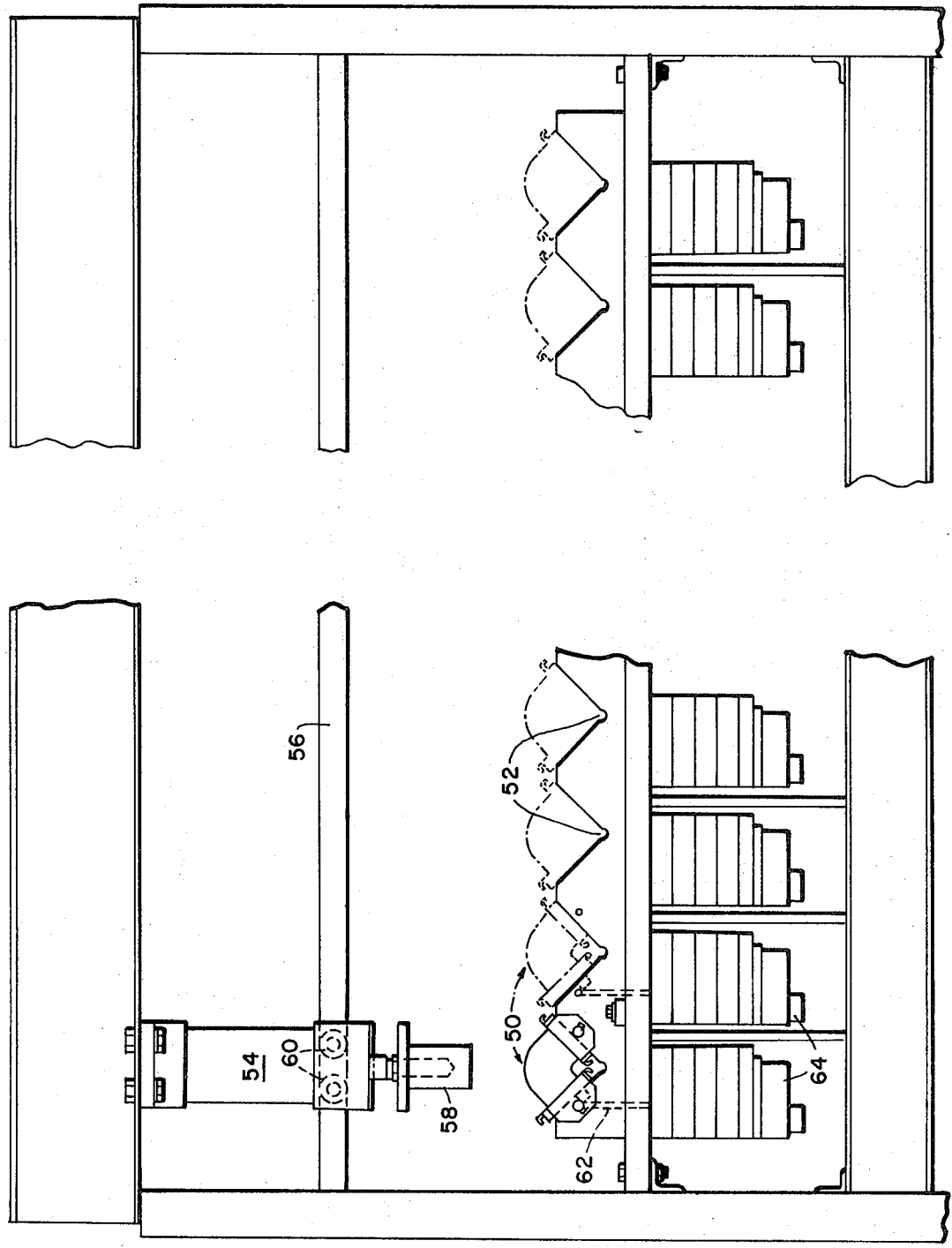

3,543,563
CONTROL VALVE ASSEMBLY
Paul Weien, P.O. Box 68, Marietta, Pa. 17547
Filed Oct. 24, 1968, Ser. No. 770,154
Int. Cl. G01m 3/02
U.S. Cl. 73—40         3 Claims

ABSTRACT OF THE DISCLOSURE

A control valve assembly adapted to be used in testing devices wherein a pressurized fluid is admitted to a testing system which system includes an article to be tested, a pressure differential sensor and a control valve admitting pressure to said system. The control valve enables a predetermined time span to elapse between initially connecting the system and the time at which the pressure is stabilized in the system. The time span is desirable in order to enable the system to achieve a stability while maintaining adequate pressure in all of the component parts.

---

This invention broadly relates to valves, and more specifically relates to a value utilizing a movable piston which is capable of automatically sealing a device after a predetermined time has elapsed. The valve is useful in many instances, but is particularly adapted for use in pressure testing system as a means to admit pressure to said system.

While the present invention specifically relates to a valve, it is considered desirable to describe the valve in conjunction with its most useful application, that is, in pressure testing systems. Accordingly, while the following description is related to a pressure testing system, it should be understood that the novel valve per se forms an integral part of the present invention.

In pressure testing systems utilized in the past, it is conventional to establish a pressure within an article and then to determine whether any fluid leaks from the article. When the article comprises a cylindrical element such as a can or a pipe or a pipe fitting, it is conventional to attach a conduit to the opened parts of the article and to connect these conduits to each other through a pressure sensing device such as a movable diaphragm. In use, the system establishes equivalent pressures on either side of the diaphragm, and any leakage from the system will destroy the stability originally present due to the equalized pressure, thus causing the diaphragm to move. This physical movement is easily converted to an electrical impulse which is again converted to a physical movement in the form of a dial reading movement. Other systems have utilized means to develop equalized pressures in a system and to cause some element called a sensor to be activated when the pressure within the closed system changes due to leakage. The leakage corresponds to a defective article, and by using conventional testing equipment defective articles may be ejected while suitable articles are further processed by filling, etc.

The present invention relates to such systems adapted to test hollow articles for pressure leaks. Any suitable sensing device may be utilized; however, the movable diaphragm system is convenient and particularly suitable in the industry. The present invention comprises a means to admit pressurized fluid such as compressed air to the testing system. It is obvious that pressure testing systems must have a means for admitting a predetermined volume of fluid to the system and to thereafter seal the system effectively against leakage in order to achieve the desired results of testing the article. In order to protect the delicate sensing devices which form a part of the system, it is not possible to allow the pressurizing fluid to rush in initially since this causes fluctuations of a large dimension in the sensor, thus producing a rapid deterioration of the sensing element. It is desirable to have a slowly pressurized system which will automatically seal when a predetermined volume of fluid has been admitted. Previously used devices such as a mere open and shut valve do not achieve the desired results since it requires a manual adjustment of the valve to admit fluid and then to seal the system. It is difficult in these instances to admit the proper quantity of fluid since it involves a manual adjustment of the valve device.

Accordingly, it is an object of the present invention to provide an automatically operating valve adapted to admit a predetermined volume of fluid to a pressure testing system and to automatically isolate the system.

Another object is to provide a valve device utilizing a movable piston which admits fluid to one side of the piston at a varying rate from the rate of admission to the opposite side of the piston.

A further object is to provide a control valve which may quickly release an established line pressure in an isolated system.

These and other objects and advantages of the present invention will become apparent from a reference to the following description and drawings. In the drawings like elements are represented by like numerals and FIG. 1 illustrates a top view of the control valve of the present invention;

FIG. 6 illustrates a pressure testing system adapted to use the control valve of the present invention.

Figure 4:
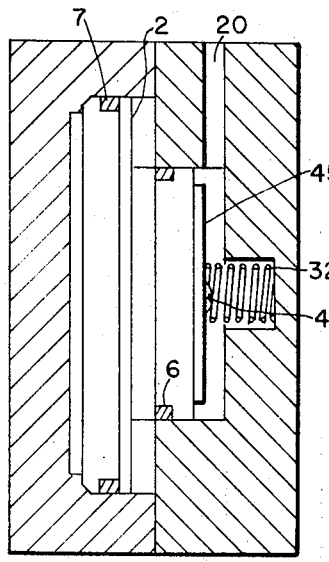
FIG. 4 represents a sectional view taken along lines 4—4 of FIG. 1.
Figure 1:
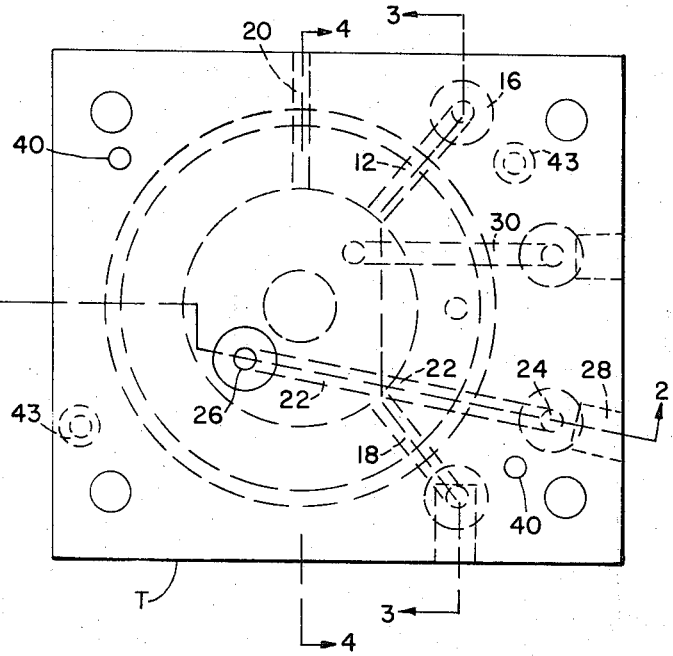

Referring to the drawings and specifically to FIG. 1, the valve is seen to comprise a housing formed of top half T and bottom half B which together define a cavity C housing piston P. Piston P comprises a large end 2 and small end 4 each provided with an outer peripheral groove in which is seated an O-ring 6. The piston is movable within the bounds of the cavity and the space on either side of the piston is sealed by means of O-ring 6 so that no leakage of fluid can occur. Keeping the spaces separate is important in the functioning of the valve as is set out more fully below.

Figure 3:
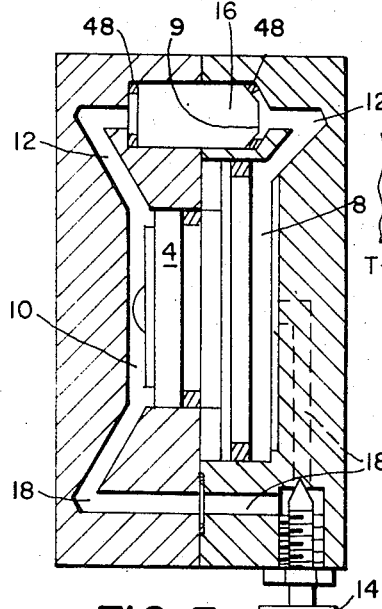
FIG. 3 represents a sectional view taken along lines 3—3 of FIG. 1.

The large cavity area 8 facing large piston end 2 communicates with the small cavity area 10 facing small piston end 4 by the conduits 12 and 18 shown in FIG. 3. Conduit 12 leads from large area 8 through chamber 16 past check valve 9 to small area 10. Conduit 18 leads from large area 8 past needle valve 14 to small area 10. The purpose of the needle valve is to adjust the rate of flow of pressurizing fluid so that the equilibrium point wherein the faces of piston P are under equal pressure will be reached in a preselected delayed time interval. In this respect, it is noted that pressurizing fluid such as air is initially fed to a closed system by means of the subject valve and it is desirable to allow a time delay from the initial pressurizing to the filled or "equilibrium" point.

Figure 2:
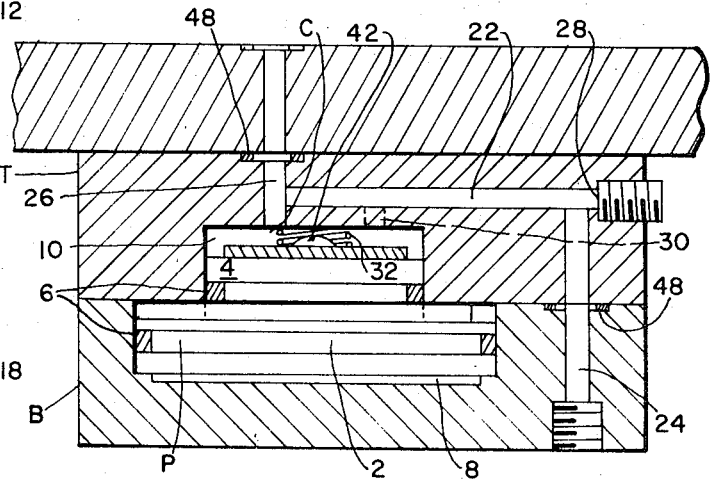
FIG. 2 illustrates a sectional view taken along lines 2—2 of FIG. 1.

The small cavity area 10 facing small piston face 4 communicated with area 8 via conduits 12 and 18 was noted above. Further, area 10 communicates with the exterior of the valve unit through conduits 20, 22 and 30. Conduit 20 (FIG. 1) serves as a pressurizing fluid inlet and is connected to a suitable source such as a conventional air compressor. Conduit 22 (FIG. 2) has a first branch 26 which communicates with a test item and thus leads to the closed system being tested; second branch 28 and third branch 24 lead to a differential pressure sensor which indicates any change in the pressure once equilibrium is reached which is of course caused when the closed system leaks. Conduit 30 (FIG. 1) leads from the exterior to small valve area 10.

Thus, when fluid is introduced, through a conventional three way valve attached to a supply line via conduit 20, it flows into small area 10 forcing piston P to its down position (into large area 8). Since small area 10 communicates with the closed system comprising an item to be tested I a pressure sensor S, and the valve V (FIG. 5) the fluid admitted via conduit 20 will pass to the test item via conduit 26 and simultaneously will pass to the sensor via conduits 22 and 24 and/or 28 depending on what type sensor is used. If a differential sensor utilizes a flexible diaphragm, then fluid must be supplied to both sides of the diaphragm and both 24 and 28 are utilized whereas other sensors may require only one feed and either 24 or 28 may be sealed.

The device shown is intended to be used with a conventional flexible diaphragm pressure sensor so both conduits 28 and 24 are open leading to opposite sides of a diaphragm. Conduit 30 allows fluid to escape until piston P moves to its upward position (into small area 10). The valve and function of the valve is now apparent since once the piston is in its upward position the outlet 30 is sealed and the system is closed with the equilibrium pressure for testing established. The time delay between initial supply of fluid and equilibrium is achieved by use of needle valve 14 which is adjusted to allow a slow leakage of fluid from small area 10 via conduit 18 into large area 8 (See FIG. 3) where the bias of spring 32 is gradually overcome as pressure on piston P at 2 increases. Flow via conduit 12 is prevented by check valve 9 (a one way valve).

Once the system is sealed the leakage of fluid from the test item will result in movement of the diaphragm in the pressure sensor which movement is converted to an electrical signal in a known manner. A suitable sensor is described in U.S. Pat. 3,028,750, although any equivalent means is possible.

Figure 5:
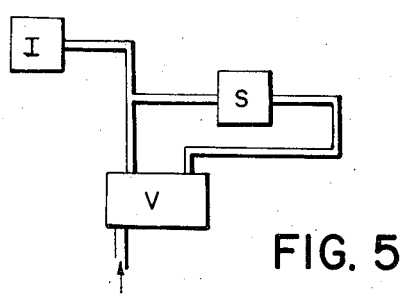
FIG. 5 is a flow diagram of a suitable system for using the invention.

As seen in FIG. 5, the flow diagram illustrates the closed system wherein fluid is supplied to valve V, thence to test item I and to either side of pressure sensor S.

When the test period is completed, the system is to be exhausted. The supply pressure is turned off and the system leaks through the thee way valve used to supply air to the valve. Pressurizing fluid may be dumped through check valve 9 once pressure is released due to said leakage. A suitable three way valve for connection via conduit 20 is shown in U.S. Pat. 3,359,785, but any equivalent may be used; thus, with no air being supplied the entire pressurized system is released via inlet 20 and once the piston P returns to its downward position, fluid may also escape via conduit 30.

The assembly of the valve will now be described in an effort to further illustrate the construction thereof.

Dowel pins 40 are inserted into piston top T and spring 32 is placed in small area 10 of T. Two dowel pins 40 may be steel pins approximately ⅛ inch in outer diameter OD and 2 inches long. Spring 32 is a steel spring about 1¼ inch long and about ½ inch OD formed of 18 gauge steel wire. Small cavity 10 is about 1¾ inch in diameter. Next, piston P is assembled by securing large and small parts 2 and 4 with brass stove bolt 42 which is ½ inch long. The piston parts are formed of aluminum except for cap 45 which is a polyurethane disc about 1½ inch in diameter and ¼ inch thick. O-rings 6 are lubricated and slipped in grooves on piston parts 2 and 4.

Then, the piston is lubricated and placed in the cavity of piston block T. Piston block parts T and B are aluminum elements about 1 inch thick and 5 inches square. When inserting the piston, care must be taken to insure spring 32 straddles bolt 42. Then, O-rings 48 are inserted in block bottom B. Check valve 9 is then inserted with lubrication applied. Blocks T and B are next joined by sliding together with dowel pins 40 guiding the juncture. The block is next fastened by inserting bolts 43 which are steel bolts about 1½ inches long. Then, needle valve 14 is inserted in block B by screwing in with sealing compound applied to the threads.

With the valve now assembled, the pressure sensor may be attached as well as the line to the test item and to the three way valve on the fluid supply line.

The above-described valve is suitable for use in testing an article intended to be air tight in use. A suitable system adapted to handle a plurality of articles—piping joints in this case—is shown in FIG. 6.

Turning to FIG. 6, the general outline of a station for testing pipe fittings 50 is shown. The units 50 are assembled by being placed in posts 52. Movable air cylinder 54 is driven by a motor not shown and is adapted to traverse beam 56 on rollers 60 and to hold a unit 50 on post 52 by actuation of reciprocable piston 58. Posts 52 have conduits 62 (shown in dotted lines) communicating with fluid supply system including the novel valve of this invention. Any suitable means for securing units 50 in place can be utilized. The piston 58 may be sequentially actuated as each unit 50 is tested to hold it in place during a test. The conduits 62 lead to valves 64 which comprise the valve of this invention leading to a pressure sensor. It is, of course, possible to test one or a plurality of units at a time. Other means for mounting a test unit are contemplated and the structure of FIG. 6 is merely illustrative of the many possible arrangements. Of course, manual or automative means can be used to initially place unit or units 50 at posts 52.

Having described the novel valve and testing system in full, clear and concise terms, it is to be pointed out that the range of use is not limited by the specific application recited herein. The use in pressure testing systems is merely one preferred and advantageous application of the invention which forms a novel combination of elements therewith.

I claim:

1. In a pressure testing system comprising a test unit, a differential pressure sensor, a source of pressurizing fluid, and conduit means interconnecting the elements, the improvement comprising a valve means to control admission of fluid to said system comprising a movable piston communicating with said source, said unit, said sensor, and the atmosphere and means to selectively cut off communication with the atmosphere after a determinable time has elapsed during pressurizing of said system, said piston comprising a large end and a small end and a spring associated with said small end, the means to cut off communication comprising said small end, and wherein said large end communicates with said small end through an adjustable valve means and said small end further communicates with the atmosphere, the test unit, and the sensor.

2. A valve comprising a housing; a piston movable in said housing and having a large end and a small end; a spring associated with the small end; a first conduit leading from said large end to said small end; a first valve means in said first conduit; a second conduit leading from said small end to the atmosphere; a second valve means in said second conduit.

3. Valve of claim 2 wherein said small end comprises said second valve means and wherein said second conduit is closed when the spring associated with the small end is overcome.

References Cited
UNITED STATES PATENTS

| | | | |
|---|---|---|---|
| 2,936,611 | 5/1960 | Le Mat et al. | 73—40 XR |
| 3,100,986 | 8/1963 | Starr et al. | 73—40 |
| 3,436,955 | 4/1969 | Wilcher | 73—37 XR |
| 3,442,428 | 5/1969 | Nilsson | 226—22 XR |

LOUIS R. PRINCE, Primary Examiner

W. A. HENRY, Assistant Examiner

U.S. Cl. X.R.

137—501, 624.11